United States Patent

Emmerling et al.

[11] Patent Number: 6,119,448
[45] Date of Patent: Sep. 19, 2000

[54] METHOD FOR METERING A REDUCING AGENT INTO $NO_x$-CONTAINING EXHAUST GAS OF AN INTERNAL COMBUSTION ENGINE

[75] Inventors: Gerhard Emmerling, Sulzkirchen; Frank Zuther, Schwabach; Andreas Döring, Nürnberg, all of Germany

[73] Assignee: MAN Nutzfahrzeuge AG, Germany

[21] Appl. No.: 09/140,359

[22] Filed: Aug. 26, 1998

[30] Foreign Application Priority Data

Aug. 26, 1997 [DE] Germany ............ 197 36 384

[51] Int. Cl.$^7$ .................................................. F01N 3/00
[52] U.S. Cl. ................. 60/274; 60/286; 60/303; 60/295; 60/285
[58] Field of Search .............. 60/274, 285, 286, 60/303, 301, 276, 277, 295

[56] References Cited

U.S. PATENT DOCUMENTS

| | | | |
|---|---|---|---|
| 5,643,536 | 7/1997 | Schmelz | 422/105 |
| 5,665,318 | 9/1997 | Rembold et al. | 422/177 |
| 5,709,080 | 1/1998 | Arora et al. | 60/274 |
| 5,842,341 | 12/1998 | Kibe | 60/274 |
| 5,950,422 | 9/1999 | Dölling | 60/274 |

FOREIGN PATENT DOCUMENTS

| | | |
|---|---|---|
| 0515857 | 12/1992 | European Pat. Off. . |
| 0697062 | 2/1996 | European Pat. Off. . |
| 4310961 | 4/1993 | Germany . |

*Primary Examiner*—Thomas Denion
*Assistant Examiner*—Binh Tran
*Attorney, Agent, or Firm*—Robert W. Becker & Associates

[57] ABSTRACT

In a method for metering a reducing agent into a $NO_x$ containing exhaust gas of an internal combustion engine before the exhaust gas enters the catalytic convertor having at least $NO_x$ reducing activity, a minimal heat capacity, and a minimal storage capacity for a reducing agent, the engine-specific data for $NO_x$ concentration and exhaust gas volume are determined with a reference engine. The actual exhaust gas temperature of the internal combustion engine during operation is measured by a sensor. The reducing agent amount is calculated based on the engine-specific data and the actual exhaust gas temperature. Load-specific parameter changes of the internal combustion engine during operation are detected and a dynamic correction of the reducing agent amount based on the load-specific parameter changes is performed. The corrected reducing agent amount is then supplied into the exhaust gas stream. In a variation of the inventive method, the $NO_x$ concentration is determined during operation of the internal combustion engine based on data provided by a sensor arranged in the exhaust gas stream upstream of the catalytic convertor.

20 Claims, 8 Drawing Sheets

METHOD FOR METERING A REDUCING AGENT INTO $NO_x$-CONTAINING EXHAUST GAS OF AN INTERNAL COMBUSTION ENGINE

BACKGROUND OF THE INVENTION

The present invention relates to a method for metering a reducing agent, especially urea, respectively, aqueous urea solutions, into $NO_x$-containing exhaust gasses of an internal combustion engine into the exhaust gas line upstream of a catalytic convertor having at least $NO_x$ reducing activity and having a minimal heat capacity and no substantial reducing agent storage activity.

In the selective catalytic reduction (SCR) of $NO_x$, a certain amount of reducing agent must be metered into the exhaust gas stream depending on the operational state of the internal combustion engine and of the SCR catalyst in order to reduce $NO_x$ to $N_2$. When not enough reducing agent is metered into the exhaust gas, the degree of reduction decreases unnecessarily. When too much reducing agent is metered into the exhaust gas, slip of reducing agent will be caused as well as undesirable intermediate and cleavage products. Furthermore, an unnecessarily high use of reducing agent will result. When the reducing agent is urea, this means that ammonia breakthrough or, when an oxidation catalytic converter is arranged downstream of the SCR catalytic convertor, emission of dinitrogen oxide ($N_2O$) will result.

From European patent application 0 515 857 A1 as well as European patent application 0 697 062 B1 methods are known which are based on the storage capacity of the catalytic convertor and an overstoichiometric amount of reducing agent being introduced intermittently.

In German patent application 43 10 961 A1 a method for detecting the catalyst activity by use of at least one temperature sensor within the catalytic convertor is disclosed.

All known methods have in common that no exact metering of reducing agent into the exhaust gas under dynamic or highly dynamic operating conditions of the internal combustion engine is possible so that dynamic or highly dynamic changes have been ignored in the past. Especially, the precise determination of the catalyst activity during dynamic load changes of the internal combustion engine has been an unsolved problem in the past.

Moreover, only a few relevant parameters have been taken into consideration in the known reducing agent metering methods. In the method known of German patent application 43 10 961 A1 it is suggested to position a plurality of temperature sensors into the catalytic convertor in order to determine one of the parameters of the catalytic convertor, i.e., the temperature. However, this appears to be not very practical and is also very expensive.

An exact determination of the reducing agent filling degree within the SCR catalyst, as is necessary in order to realize reducing agent metering according to the suggestions of European patent applications 0 697 062 B1 and 0 515 857 A1, has not been possible in the past due to the complex interrelationships of such catalyst systems. For this reason, the addition of reducing agent is intermittent and the catalyst is in this manner employed until it is empty in order to reinstate defined conditions. The disadvantage is that the $NO_x$ conversion is thus lowered.

The aforementioned documents thus are based on a metering strategy depending on a considerable storage capacity of the catalytic convertor with respect to reducing agent and heat.

This approach is, in principle, realizable for full (solid) catalytic convertors as known from power plant technology. They are comprised entirely of active material that allows, especially at low temperatures, storage of reducing agent. Due to this storage capacity the reducing agent breakthroughs at dynamic or highly dynamic load changes can thus be almost entirely avoided because excess reducing agent, especially $NH_3$, can be stored within the catalyst for a short period of time.

However, the use of such full catalytic systems in spatially limited conditions, for example, in vehicles, where a considerable reduction of dimensions and weight of the available systems is required, is not feasible because there is insufficient development potential with regard to the aforementioned specifications.

Figure 6:
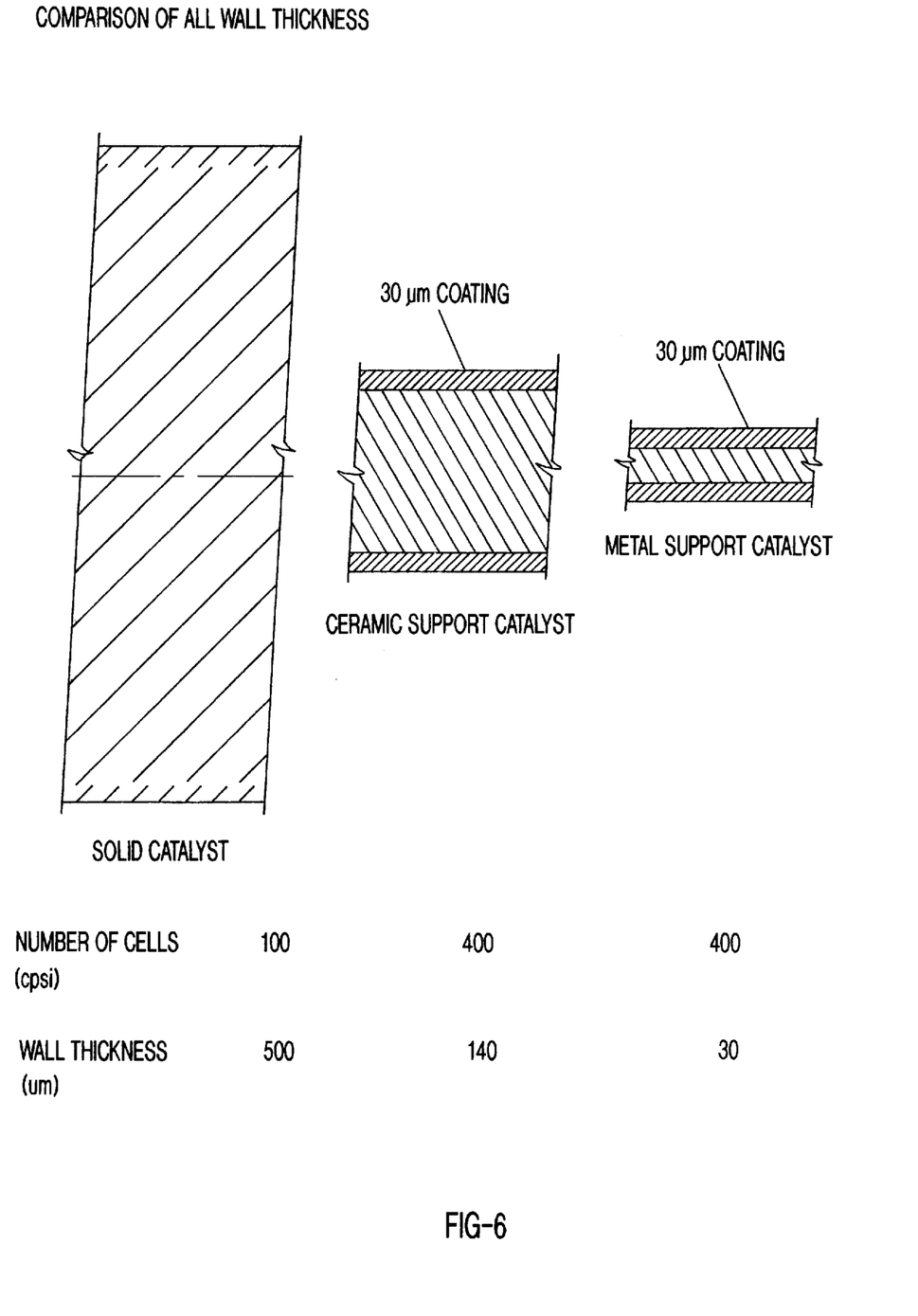
FIG. 6 shows a comparison of full (solid) catalyst verses coated catalyst, expressed by different wall thickness.

For this reason, coated catalyst are used having a cell number that is considerably higher and thus having a considerably reduced wall thickness of the support structure and a larger free flow surface with reduced pressure loss, see FIG. 6.

Such a catalyst system, however, has a minimal storage capacity for $NH_3$ because active material of a substantially reduced activity is available. Reducing agent peaks thus cannot be compensated by absorption, and undesirable emissions of reducing agent products is thus a great risk.

Accordingly, greater demands with respect to precision of metering and the detection of parameters, such as catalyst temperature, $NO_x$ concentration, exhaust gas volume, catalyst activity etc., is much more important in comparison to full catalytic systems.

It is therefore an object of the present invention to provide a method of the aforementioned kind with which dynamic changes of the internal combustion engine operation can be taken into consideration in order to optimize the amount of reducing agent supplied to the exhaust gas.

SUMMARY OF THE INVENTION

The inventive method is based in a first embodiment on the following method steps. First, with the aid of a reference internal combustion engine which corresponds to the internal combustion engine to be used, engine-specific parameters are determined on a dynamic engine testing stand for the $NO_x$ concentration within the exhaust gas and the emitted exhaust gas volume and are saved in a characteristic field or data storage device of a computer controlling the metering device. These data or values are supplemented during actual engine operation at least by the values of the actual temperature of the exhaust gas and are then used in combination as control parameters for the amount of reducing agent to be added. These at least three parameters, optionally also under consideration of the concentration of the reducing agent, are then used to calculate the required amount of reducing agent to be added. The thus calculated reducing agent amount for stationary conditions is then subjected, as a function of the detected load changes of the internal combustion engine, to a dynamic or highly dynamic correction so that it is possible to add to the exhaust gas stream quickly adjusted and adapted reducing agent amounts so that the changing exhaust gas volume with its deviating exhaust values can be converted optimally by the catalytic convertor without experiencing reducing agent slip or emission of undesirable intermediate or cleavage products.

In the second embodiment of the present invention, during operation of the internal combustion engine the $NO_x$ concentration is determined based on data which are detected by sensors positioned within the exhaust gas stream upstream of the catalytic convertor. The exhaust gas volume of the internal combustion engine is calculated from engine-specific values. During operation of the internal combustion engine it is possible to take into consideration, in addition to the temperature of the exhaust gas measured by a sensor, also the exhaust gas temperature at the inlet of the catalytic convertor prevailing for a certain period of time, which may be variable, before measuring the exhaust gas temperature. Such measures are taken for load changes during actual engine operation which require only a dynamic but no highly dynamic correction of the amount of reducing agent to be added to the exhaust gas. This memory recall allows for a refined control strategy with a certain anticipation of future engine operation conditions and the resulting requirements with regard to the catalyst system.

Advantageous details and individual steps of the method will be explained in the following.

It may be expedient to control the $NO_x$ concentration in the exhaust gas downstream of the catalytic convertor and to use the detected control values for affecting the control of the amount of reducing agent to be added to the exhaust gas.

It is also expedient to perform a set point and actual value comparison between the calculated amount of reducing agent and the actual amount added to the exhaust gas whereby the actual amount of reducing agent can be determined by a sensor or a measuring element provided at a suitable location.

For highly dynamic load changes of the internal combustion engine during operation which require a highly dynamic correction of the amount of reducing agent to be added to the exhaust gas, the rate of load changes of the internal combustion engine is also determined as a further control criterium and taken into consideration. In this manner, easy adjustments in response to load changes are possible.

It is also expedient to determine the actual temperature of the charge air (intake air) with a sensor in order to compare it to predetermined reference values and to use this as an indicator whether during operation of the internal combustion engine the actual exhaust gas volume corresponds to the stored reference values for the exhaust gas volume. If the comparison of set point value and actual value makes it necessary, the comparison result will be used for a correction of the amount of reducing agent to be added to the exhaust gas. In this manner, it is possible to take into consideration greatly varying climatic conditions in which the internal combustion engine may be used, respectively, to take into consideration the resulting effects on the exhaust gas volume and composition.

Especially under such operational conditions subject to great temperature fluctuations, it may be expedient to check the quality of the reducing agent, especially when it is in liquid form. This can be carried out, for example, by detecting the temperature of the stored reducing agent with a sensor and to calculate based thereon its density, whereby the actual value is compared to stored reference values. Depending on the result of this comparison, a correction of the amount of reducing agent to be added to the exhaust gas may be performed.

It is also expedient to consider from the start the aging of the catalytic convertor and the resulting activity reduction. The operating or service time of the catalyst is calculated based on the operational service time of the internal combustion engine. Depending on the length of operation or the determined operating period intervals, the aging of the catalyst can be taken into consideration for corresponding changes in regard to the amount of reducing agent to be added to the exhaust gas.

Furthermore, the determined reducing activity of a reference catalyst can be used for different reducing agent concentrations in order to optimize the amount of reducing agent to be added.

The inventive method is especially suitable in connection with highly dynamically operated internal combustion engines which are, for example, employed in stationary facilities or in vehicles, motor vehicles, trucks of any type or use, busses, etc.

The invention is based on the following theories.

The amount of reducing agent to be added to the exhaust gas of an internal combustion engine depends, on the one hand, on the amount of exhaust gas emission, and, on the other hand, on the capacity (activity) of the catalytic convertor to reduce the exhaust gas emission.

The activity, respectively, the reducing capacity of a catalytic convertor can be described by various equations.

As a simple example of such an equation the following formally kinetic approach should be mentioned. For the fictitious reaction E→B, whereby E is a component of the exhaust gas to be reduced, for example, $NO_x$, and P is the reduction product, for example, $N_2$, the change of concentration dc of the starting compound E over time can be described (when assuming a constant volume) as follows $$R_E = \frac{dc}{dt} = k \cdot c^m \quad (1)$$

$R_E$ is the rate of molar conversion of E (mol/s), m is the order of the reaction [-].

The rate constant k is a measure for the speed of the reaction and depends on the temperature as follows:

$$k = k_o \cdot e - \frac{E}{R \cdot T} \quad (2)$$

wherein

E=activation energy [J/mol]

R=gas constant=8.314 J/(mol*K)

T=temperature [K]

$k_o$=impact coefficient.

After integration of (1) for m=1 (reaction of first order) the following results:

$$c = c_o \cdot e^{-kt} \quad (3)$$

wherein c=volume stream [mol/m³]

$c_o$=starting concentration [mol/m³]

t=reaction time [s].

The reaction time is equal to the residence time τ in the reactor:

$$\tau = \frac{V_{Kat}}{V} \quad (4)$$

wherein

V=volume stream [m³/s]p1 $V_{Kat}$=catalyst volume [m³].

These equations illustrate that the final concentration c in this case depends linearly on the starting concentration, but does not depend linearly on the residence time and thus also not on the volume flow. In the dynamic range it is thus not sufficient to only include the $NO_x$ mass flow or $NO_x$ volume flow, as suggested in European patent application 0 697 062

B1, because it is not possible to provide an unambiguous correlation to one operation point of the catalyst system. For example, a high $NO_x$ mass flow can result from a high $NO_x$ concentration and a low exhaust gas mass flow or may result from a low $NO_x$ concentration but a high exhaust gas mass flow. This results in different $NO_x$ conversion.

The reaction temperature has a considerable effect through the rate constant k onto the molar change rate.

In addition, the effect of the reducing agent concentration can also be taken into consideration, compare equations 5 and 6.

Formally kinetic approach:

$$R_{NO} = k \cdot c^m_{NO} \cdot c^n_{NH_3} \qquad (5)$$

Mechanistic approach:

$$R_{NO} = \frac{k \cdot K \cdot c^m_{NO} \cdot c^n_{NH_3}}{1 + K \cdot c_{NH_3}} \qquad (6)$$

wherein

K = sorption equalization constant of $NH_3$ [$m^3$/mol].

When especially precise predictions in regard to the activity of the catalyst are desired, it is thus expedient to consider the respective effects separate from one another instead of combining the $NO_x$ concentration and the resulting exhaust gas amount as a common $NO_x$ flow.

The determination of a global rate approach for the purpose of realizing the metering of the reducing agent appears under realistic conditions because it is impossible to determine precisely enough the reducing capacity over the entire operating range of the catalyst and, on the other hand, the interrelationships are not immediately obvious. The fine adjusting of the reducing agent metering thus would be expected to be very difficult.

For this reason, it is inventively suggested to employ for determining the $NO_x$ reducing capacity a characteristic field of a reference internal combustion engine which allows replacement of a global molar change rate approach by correlating individual molar change rates to certain operational points of the catalytic system.

The characteristic field or fields contain the main parameters $NO_x$ concentration c, the fictitious working temperature $T_A$, the exhaust gas volume flow $\dot{V}_{exhaustgas}$ and optionally the reducing agent concentration. By employing $\dot{V}_{exhaustgas}$ the residence time T as well as the gas velocity, which also has an effect on film diffusion, are taken into consideration.

Figure 2:
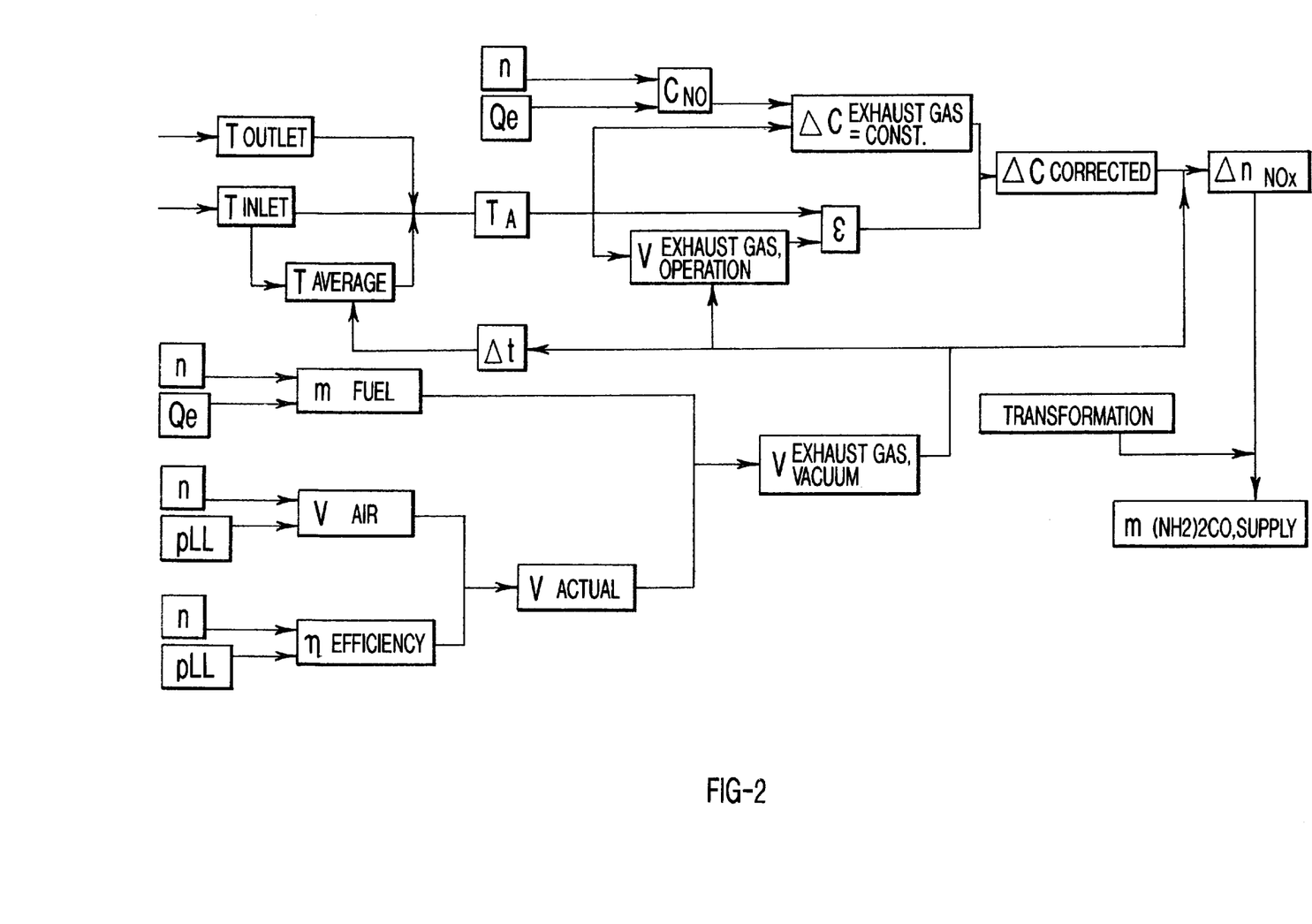
FIG. 2 shows a metering strategy for metering urea with dynamic correction by a fictitious working temperature.
Figure 3:
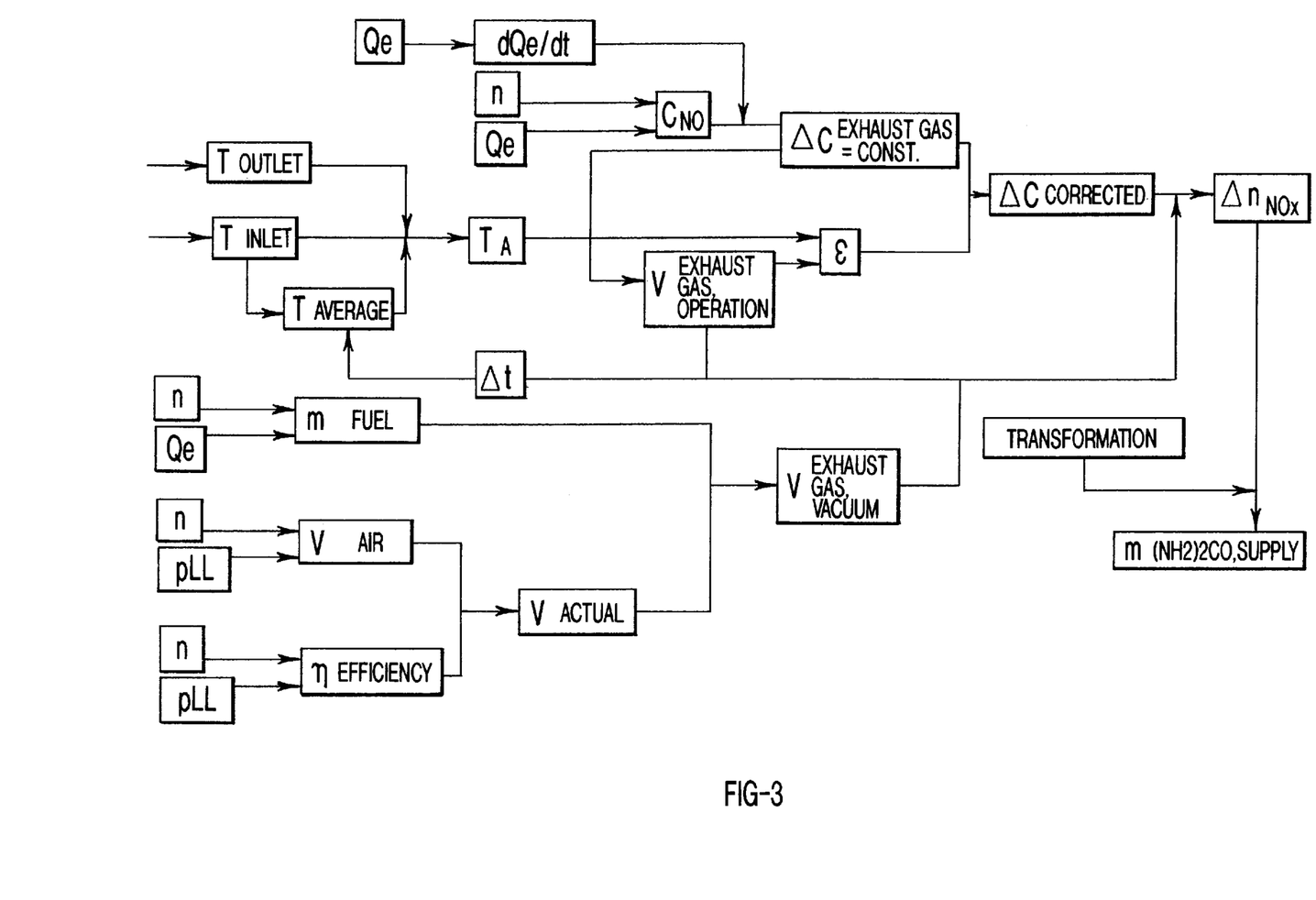
FIG. 3 shows a metering strategy for reducing agent metering with highly dynamic correction of the amount of reducing agent.
Figure 4:
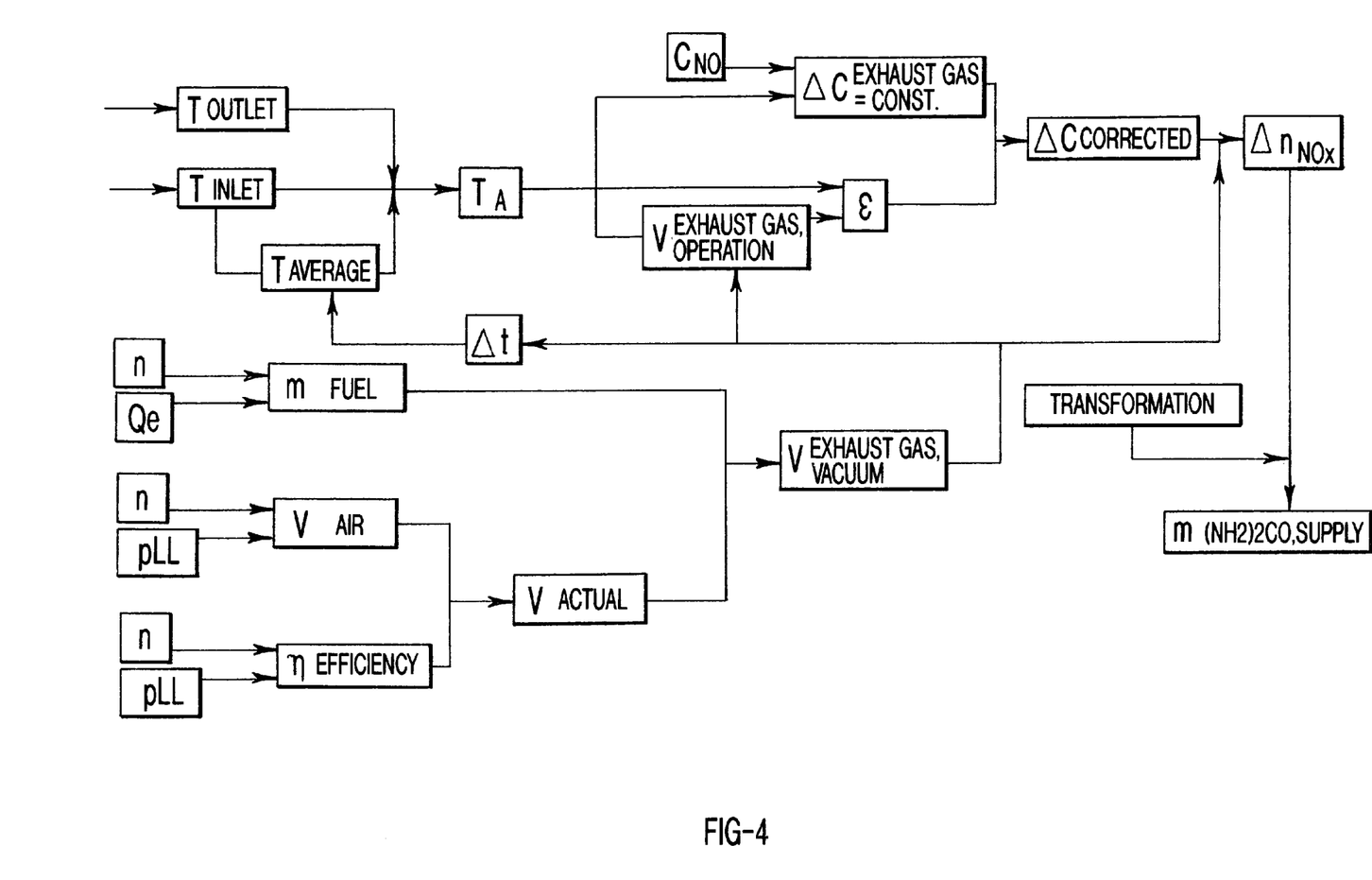
FIG. 4 shows a metering strategy for reducing agent metering with $NO_x$ sensor.
Figure 5:
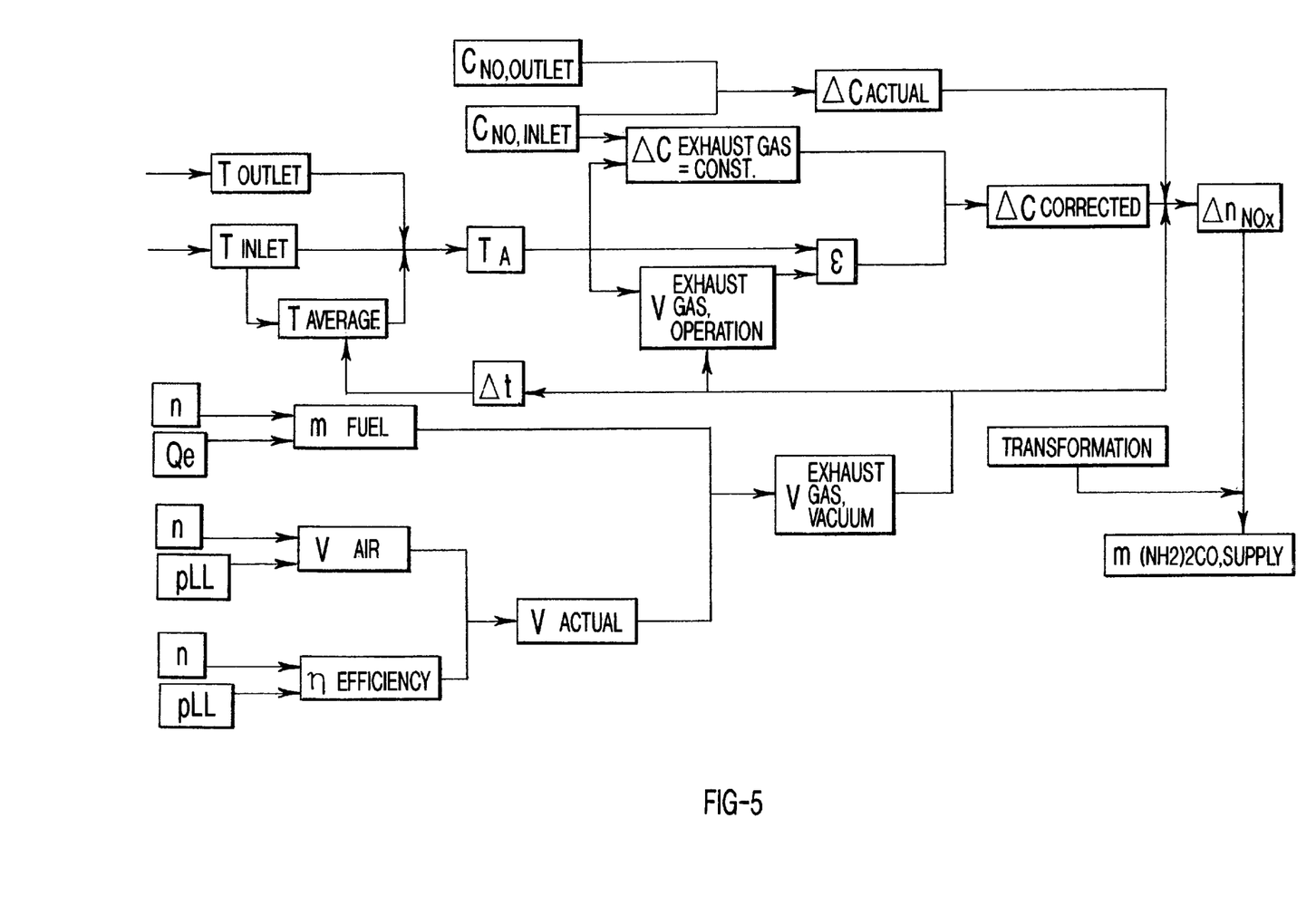
FIG. 5 shows a metering strategy for metering reducing agent with control by a plurality of NOx sensors.

Since a single characteristic field encompassing all of the aforementioned parameters would have to be at least three dimensional, it is expedient to provide at least two characteristic fields of the reference internal combustion engine in separate form and to later calculate therefrom the $NO_x$ reducing behavior of the catalyst; compare FIG. 2.

For example, in the first characteristic field ($\Delta c_{\dot{V}exhaustgas=constant}$ characteristic field, containing the information for the molar change rate) the final concentration for constant $\dot{V}_{exhaust\,gas}$ [$m^3$/h], variable $NO_x$ starting concentration $c_o$ [ppm] and $T_A$ [° C.]. $T_A$ is a fictitious working temperature. $c_o$ can be taken from an engine-specific characteristic field that is plotted against the rpm as well as a load-depending signal (for example, amount of injected fuel Qe), or can be directly determined by an $NO_x$ sensor during operation of the internal combustion engine.

The second characteristic field ($\epsilon$-characteristic field) that is plotted against the fictitious working temperature $T_A$ and $\dot{V}_{exhaust\,gas}$ [$m^3$/h] serves, on the one hand, to introduce the effect of the residence time into the calculation and, on the other hand, to compensate non-uniform behavior such as flow, film diffusion effects, backflow etc. This characteristic field contains the correction factor $\epsilon$ [-].

Based on the first characteristic field $\Delta c_{\dot{V}exhaustgas=constant} = c_o - c$ is calculated and multiplied by $\epsilon$. This results in, if highly dynamic effects and parameters resulting from the reducing agent concentration remain unconsidered, the actually reducible concentration difference $\Delta c_{corrected}$ [ppm]. After multiplication with $\dot{V}_{exhaust\,gas}$ the reducible $NO_x$ mass flow $\Delta \dot{n}\,NO_x$ [mol/h] will result. A subsequent transformation results in the required amount of reducing agent which is indicated for the conventionally employed urea as $\dot{m}_{(NH2)2CO}$, supply [g/h].

Determination of the temperature parameter

Since, as can be taken from the above, the reaction temperature T has a great effect on the rate of the reaction and thus on the conversion, it is unavoidable to try to find a possibility to determine the temperature as exactly as possible. This is a problem inasmuch as the exhaust gas temperatures changes all the time within the dynamic range. The use of temperature sensors upstream and downstream of the catalytic convertor cannot correctly reflect the temperature course within the catalyst and furnishing the catalytic convertor with a plurality of temperature sensors is expensive and difficult.

When the internal combustion engine, for example, after just being operated at great load, is operated at a low load, a cold temperature zone is pushed through the catalytic convertor. The trailing temperature sensor will still indicate hot temperatures, while the leading sensor will indicate cold temperatures at the inlet of the catalytic converter. When a load jump to greater loads results, the sensor at the inlet will already indicate hot temperatures while the sensor at the end is still hot, but the temperature within the catalyst is in reality substantially lower, see FIG. 8. Because the detected temperature is higher than the actual temperature, too much reducing agent will be introduced into the exhaust gas at this moment and cannot be converted. Thus, reducing agent slip will result. A solution to this problem is the consideration of the history of the catalytic convertor temperature within the metering strategy. Accordingly a dynamic correction of the reducing agent amount takes into consideration, in addition to the measured temperature of the exhaust gas, also the exhaust gas temperature at the inlet of the catalytic convertor prevailing for a certain period of time before measuring the exhaust gas temperature point.

For this purpose, a sliding average value $T_{Average}$ is provided for the temperature at the inlet of the catalytic convertor which is designed to compensate temperature peaks. Together with other catalyst-relevant temperatures, for example, the temperature at the catalytic convertor inlet and outlet, it then forms the fictitious working temperature $T_A$ with which then the data can be read in the characteristic field.

$$T_A = y \cdot T_{Average} + \Sigma(x_i, T_i) \qquad (7)$$

wherein $T_i$ = catalyst-relevant temperatures (for example, temperatures at the inlet $T_{inlet}$ and at the outlet $T_{outlet}$)

$T_{Average}$ = sliding average of the temperature;

$T_{Average} = f(T_{inlet}, \dot{V}_{exhaust\,gas})$ $\Sigma x_i + y = 1$

The factors $x_i$ and y result in a weighting of the individual temperatures.

The catalytic convertor will heat or cool faster for a large exhaust gas volume flow than for small flow. For this reason, the length of the time interval Δt that is used for averaging, is varied for a characteristic line of $V_{exhaust\ gas}$ in order to adapt the response behavior of $T_{Average}$ to the respective operational conditions.

For calculating the temperature $T_{Average}$ it is thus necessary to reserve a certain number of time intervals.

For the detection frequency f the following results $$f = n/\Delta t$$

whereby n=number of time intervals [–]

Δt=total detection length of the average value [s].

It is also possible to set a fixed frequency and to vary the number of individual time intervals.

Determination of the exhaust gas flow parameter (for example, exhaust gas volume stream)

The theoretic air volume flow can be determined, for example, based on the piston displacement of the internal combustion engine, the rpm n and the vacuum tube pressure pLL, can then be corrected by the engine-specific efficiency and can be combined with the fuel mass, which results from the rpm n and Qe, to the exhaust gas volume flow under vacuum conditions.

For plotting within the ε-characteristic field, the value $\dot{V}_{exhaust\ gas,vacuum}$ can also be corrected by the operating temperature, determined based on $T_{inlet}$.

Detection of $NO_x$ concentration parameter

The starting concentration of $NO_x$ can be determined according to the first embodiment based on engine-specific data, for example, with the aid of characteristic fields, or, according to the second embodiment, by $NO_x$ sensors.

Figure 7:
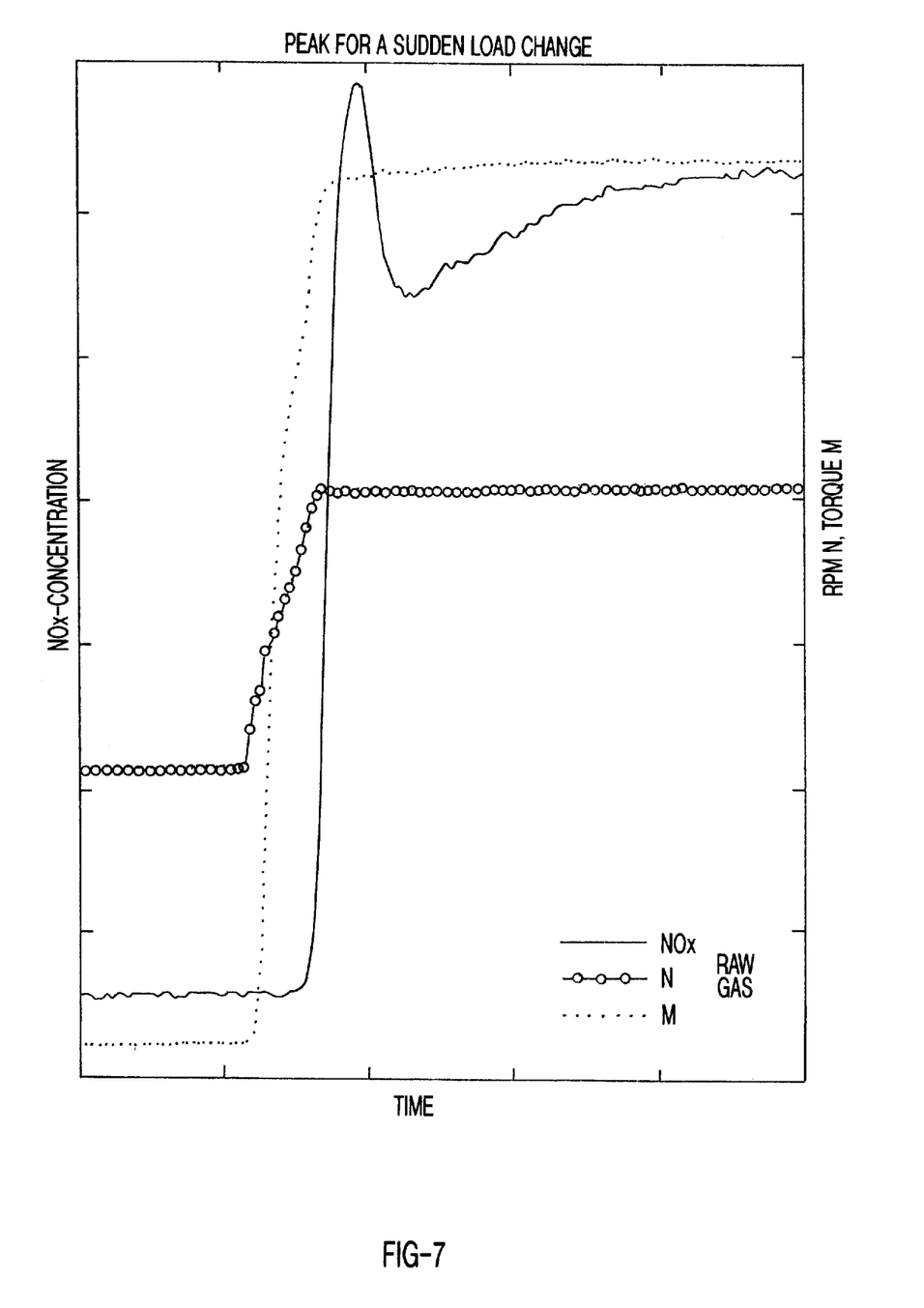
FIG. 7 shows the appearance of $NO_x$ peaks for sudden load change.

During the highly dynamic operation of the internal combustion engine, $NO_x$ concentration peaks or valleys will appear for short periods of time which deviate substantially from the concentrations detected for a stationary engine operation, see FIG. 7. By providing a characteristic line for the load change rate, this behavior can be taken into consideration during highly dynamic operation.

In the following a few summarizing remarks are presented.

The advantage of the invention relative to known methods is, on the one hand, that only a continuous strand is used for control.

This promises a simple handling in the application, since reactions to change can be easily related to certain characteristic fields or calculation factors. Furthermore, by using the parameters temperature, starting concentration, volume stream as well as optionally the concentration of the reducing agent in conjunction with their separation into at least two characteristic fields, a greatest possible transparency will result.

By using the $NO_x$ concentration, it is easily possible to introduce the $NO_x$ sensors into the metering strategy (replacement of the characteristic field $C_{NO}$ by sensor data. Furthermore, it is possible to realize, by providing an $NO_x$ sensor downstream of the catalyst, a further control.

For sudden load changes $NO_x$ concentration peaks and valleys will result which cannot be determined stationarily. For such highly dynamic condition changes an additional correction may be provided which can affect the metering control by the rate of the load changes, i.e., $C_{NO}$ can be corrected upwardly or downwardly.

A dynamic correction of the fictitious working temperature $T_A$ is provided.

When calculating $\dot{V}_{exhaust\ gas}$ as well as transforming the concentration from [ppm] into [mol/m³] the air temperature for vacuum conditions is estimated. A temperature measuring location may provide an increase of precision.

A density correction for the urea/water solution may be provided in order to minimize metering errors due to density differences.

Different schematic representations of the metering strategies are shown in FIGS. 2 through 5 in the form of flow charts.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 8.

Figure 1:
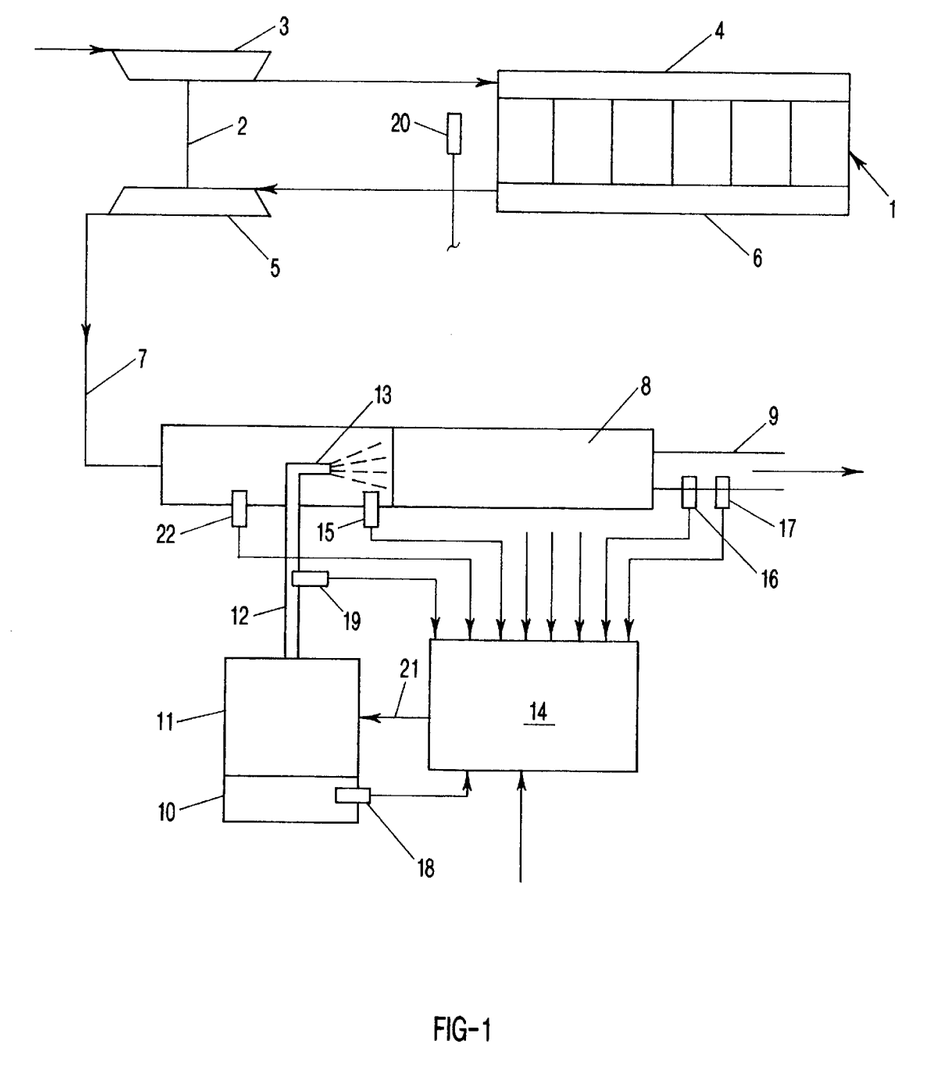
FIG. 1 shows schematically an internal combustion engine with an exhaust gas treatment device for explaining the inventive metering method.

A turbo-charged internal combustion engine 1 is shown in FIG. 1 and includes an exhaust gas turbo charger 2. The compressor 3 of the exhaust gas turbo charger 2 supplies charge air into the charge air line 4 of the internal combustion engine 1. The turbine 5 of the exhaust gas turbo charger 2 is supplied with exhaust gas via an exhaust gas manifold 6 connected to the individual cylinders of the internal combustion engine 1 for drive purposes. From the outlet of the exhaust gas turbine 5 the exhaust gas is guided via exhaust gas line 7 to a catalytic convertor 8 mounted therein and flows then as clean exhaust gas via outlet line 9 out of the catalytic converter 8. The reference numeral 10 indicates a reservoir for the liquid reducing agent, while reference numeral 11 indicates the metering device that supplies the reducing agent via line 12 and the jet 13 positioned within the exhaust gas line into the exhaust gas stream upstream of the catalytic converter 8. The reference numeral 14 indicates a control device that controls the metering device 11. The control device 14 comprises a central control unit in the form of a microprocessor that is connected by a databus system to the input and output periphery as well as to the characteristic field and data storage means and program storage devices. Within the program storage device the control philosophy (software) and the control algorithms for controlling the metering device for the inventive method are stored. In the characteristic field or data storage means the reference and set point values are stored, according to which the control of the metering device in accordance with the present method is carried out. Reference numeral 15 shows a temperature sensor that measures the exhaust gas temperature before entering the catalytic convertor 8. Reference numeral 16 indicates a temperature sensor which measures the exhaust gas temperature at the outlet of the catalytic convertor. A sensor or measuring element is indicated by reference numeral 17 which sensor determines the $NO_x$ concentration within the exhaust gas downstream of the catalytic converter or for a representative portion of the exhaust gas. Temperature sensor 18 measures the temperature of the reducing agent in the reservoir and thus allows determination of the actual density of the reducing agent. Sensor 19 determines the flowthrough or metered amount (actual value) of the reducing agent introduced into the exhaust gas. A temperature sensor 20 detects the actual intake air temperature or charge air temperature. The measured values of the sensors 15, 16, 17, 18, 19, 20 and further sensors for allowing monitoring of the engine operation are supplied to the control device 14 via its input periphery and are then internally processed. The resulting control commands are then supplied via the output periphery and corresponding control line 21 to the metering device 11 which transforms the received signals into values for the required amount of reducing agent to be introduced into the exhaust gas.

In the alternative embodiment of the inventive method, $NO_x$ concentration is not determined with the aid of reference values determined by a reference internal combustion engine, but by a sensor 22 which is arranged upstream of the catalytic converter 8 and upstream of the jet 13. The reference internal combustion engine thus serves only for determining the amount of exhaust gas.

The individual steps of the metering strategies can be taken from the illustrations of FIGS. 2 through 5.

FIG. 6 shows a comparison of the catalyst used for $NO_x$ reduction to a full (solid) catalyst as used in power plants. The full catalyst is not suitable for dynamic processes because of its thermal inertia.

FIG. 7 shows the appearance of a $NO_x$ peak for load change.

Figure 8:
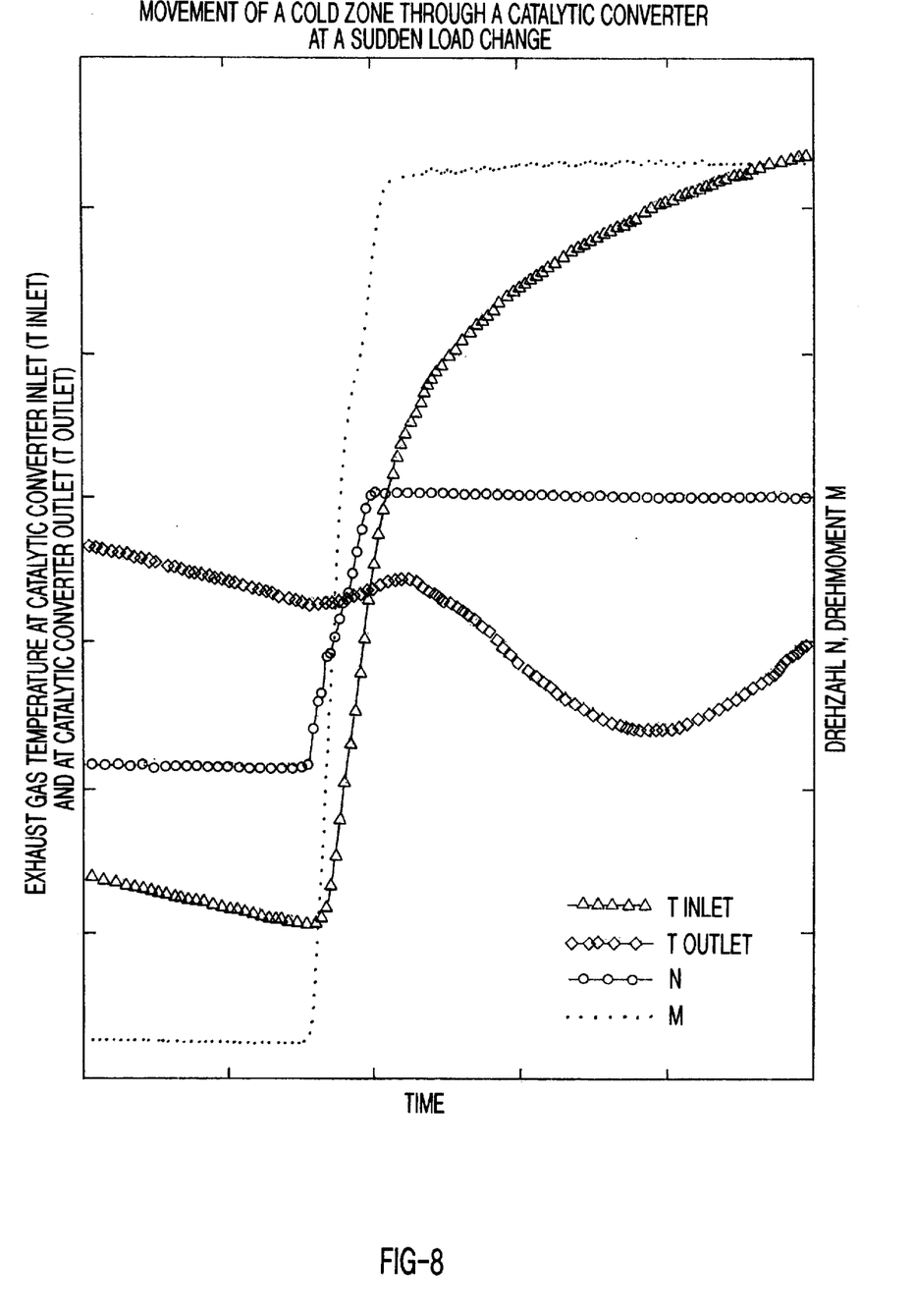
FIG. 8 shows the movement of a cold zone through the catalyst.

FIG. 8 shows movement of a cold zone through the catalytic convertor.

What is claimed is:

1. A method for metering a reducing agent into a $NO_x$-containing exhaust gas of an internal combustion engine before the exhaust gas enters a catalytic converter of the internal combustion engine, wherein the catalytic converter has at least $NO_x$ reducing activity, a minimal heat capacity, and a minimal storage capacity for a reducing agent, said method comprising the steps of:
    a) determining engine-specific data for $NO_x$ concentration and exhaust gas volume with a reference engine;
    b) measuring an actual exhaust gas temperature of the internal combustion engine during operation;
    c) calculating a reducing agent amount based on the engine-specific data and at least the actual exhaust gas temperature;
    d) detecting load-specific parameter changes of the internal combustion engine during operation;
    e) performing a dynamic correction of the reducing agent amount of step c) based on the load-specific parameter changes;
    f) supplying the corrected reducing agent amount of step e) to the exhaust gas stream.

2. A method according to claim 1, further including the step of determining a reducing agent concentration and employing the reducing agent concentration in step c).

3. A method according to claim 1, further including the step of detecting the exhaust gas temperature at an inlet of the catalytic converter prevailing for a certain period of time before step b) and employing the detected exhaust gas temperature at the inlet of the catalytic converter in step e).

4. A method according to claim 1, further including the step of measuring the $NO_x$ concentration downstream of the catalytic converter and employing the measured $NO_x$ concentration in step e).

5. A method according to claim 1, further including the steps of measuring an actual amount of reducing agent supplied to the exhaust gas by a sensor and comparing the calculated reducing agent amount of step c) to the measured actual amount of reducing agent.

6. A method according to claim 1, wherein step d) includes determining a rate
   of the load-specific parameter changes and employing the determined rate of the load-specific parameter changes in step e).

7. A method according to claim 1, further including the steps of:
    measuring the actual temperature of intake air during operation of the internal combustion engine by a sensor;
    comparing the actual temperature of intake air to intake air temperature reference values in order to determine whether the actual exhaust gas volume corresponds to a reference exhaust gas volume of the engine-specific data and employing the comparison result in step e).

8. A method according to claim 1, further including the steps of:
    measuring a density of the reducing agent by a sensor;
    comparing the measured density to a reference value; and
    employing the comparison result in step e).

9. A method according to claim 1, further including the steps of:
    determining data in regard to aging and activity loss of the catalytic converter by measuring the service hours of the internal combustion engine and employing the aging and activity loss data in step e).

10. A method according to claim 1, further including the step of determining reducing activity data of a reference reducing agent for different concentrations and employing the reducing activity data in step e).

11. A method for metering a reducing agent into a $NO_x$-containing exhaust gas of an internal combustion engine before the exhaust gas enters a catalytic converter of the internal combustion engine, wherein the catalytic converter has at least $NO_x$ reducing activity, a minimal heat capacity, and a minimal storage capacity for a reducing agent, said method comprising the steps of:
    a) determining engine-specific data for exhaust gas volume with a reference engine;
    b) determining $NO_x$ concentration during operation of the internal combustion engine based on data provided by a sensor arranged in the exhaust gas stream upstream of the catalytic converter;
    c) measuring an actual exhaust gas temperature of the internal combustion engine during operation;
    d) calculating a reducing agent amount based on the engine-specific data, the $NO_x$ concentration, and at least the actual exhaust gas temperature;
    e) detecting load-specific parameter changes of the internal combustion engine during operation;
    f) performing a dynamic correction of the reducing agent amount of step d) based on the load-specific parameter changes;

g) supplying the corrected reducing agent amount of step f) to the exhaust gas stream.

12. A method according to claim 11, further including the step of determining a reducing agent concentration and employing the reducing agent concentration in step c).

13. A method according to claim 11, further including the step of detecting the exhaust gas temperature at an inlet of the catalytic converter prevailing for a certain period of time before step c) and employing the detected exhaust gas temperature at the inlet of the catalytic converter in step f).

14. A method according to claim 11, further including the step of measuring the $NO_x$ concentration downstream of the catalytic converter and employing the measured $NO_x$ concentration in step f).

15. A method according to claim 11, further including the steps of measuring an actual amount of reducing agent supplied to the exhaust gas by a sensor and comparing the calculated reducing agent amount of step c) to the measured actual amount of reducing agent.

16. A method according to claim 11, wherein step d) includes determining a rate of the load-specific parameter changes and employing the determined rate of load-specific parameter changes in step f).

17. A method according to claim 11, further including the steps of:

measuring the actual temperature of intake air during operation of the internal combustion engine by a sensor;

comparing the actual temperature of intake air to intake air temperature reference values in order to determine whether the actual exhaust gas volume corresponds to a reference exhaust gas volume of the engine-specific data and employing the comparison result in step f).

18. A method according to claim 11, further including the steps of:

measuring a density of the reducing agent by a sensor;

comparing the measured density to a reference value; and employing the comparison result in step f).

19. A method according to claim 11, further including the steps of:

determining data in regard to aging and activity loss of the catalytic converter by measuring the service hours of the internal combustion engine and employing the aging and activity loss data in step f).

20. A method according to claim 11, further including the step of determining reducing activity data of a reference reducing agent for different concentrations and employing the reducing activity data in step f).

\* \* \* \* \*

UNITED STATES PATENT AND TRADEMARK OFFICE
CERTIFICATE OF CORRECTION

PATENT NO : 6,119,448
DATED      : September 19, 2000
INVENTOR(S): Frank Zuther, Gerhard Emmerling, and Andreas Döring It is certified that error appears in the above-identified patent and that said Letters Patent are hereby corrected as shown below:

On the Title Page, the folling item should read as follows:

[75] Inventors:

Frank Zuther, Schwabach; Gerhard Emmerling, Sulzkirchen; and Andreas Döring, Neukirchen, all of Germany Signed and Sealed this Fifteenth Day of May, 2001

Attest:

NICHOLAS P. GODICI

Attesting Officer

Acting Director of the United States Patent and Trademark Office